Oct. 30, 1962 — L. A. BOTKIN — 3,060,978
AUTOMATIC VALVE STRUCTURE
Filed Aug. 5, 1959 — 3 Sheets-Sheet 1

INVENTOR.
LAWRENCE A. BOTKIN
BY Toulmin & Toulmin
ATTORNEYS

Oct. 30, 1962   L. A. BOTKIN   3,060,978
AUTOMATIC VALVE STRUCTURE
Filed Aug. 5, 1959   3 Sheets-Sheet 3

INVENTOR.
LAWRENCE A. BOTKIN
BY Toulmin & Toulmin
ATTORNEYS

United States Patent Office 3,060,978
Patented Oct. 30, 1962

3,060,978
AUTOMATIC VALVE STRUCTURE
Lawrence A. Botkin, Dayton, Ohio, assignor to Buckeye Iron & Brass Works, Dayton, Ohio, a corporation of Ohio
Filed Aug. 5, 1959, Ser. No. 831,826
3 Claims. (Cl. 141—128)

This invention relates to automatic dispensing valves and to arrangements for tripping the valves closed and is particularly concerned with a valve of this nature adapted for handling large volumes of liquid as in connection with filling tank trucks and the like.

Valves which automatically trip closed when the liquid in the container being filled reaches a predetermined level are known and are widely used in connection with dispensing fuels and the like. The valves are provided with a latch to hold the valve member open and which latch is tripped into releasing position either by a supply of pressure or suction to a diaphragm or the like when the liquid level in the container reaches a predetermined level.

It is in particular connection with a valve of this nature that the present invention is concerned. This invention is also concerned with a novel type of level detector which provides for reducing the rate of liquid supply through the valve when the liquid level in the container being filled approaches the desired limit.

A particular object of this invention is the provision of an improved automatic tripping valve of the nature referred to.

Another object of this invention is the provision of an arrangement in a manually operated automatic tripping valve for reducing the amount of force required to open the valve.

A still further object of this invention is the provision of a manually operated valve which is extremely compact but which embodies means to assist in the opening of the valve and to prevent the valve from slamming closed when tripped off.

Another object of this valve is the provision of a novel liquid level detector which is operable for tripping the valve at two different levels.

It is also an object of this invention to provide in combination an automatic tripping valve, a liquid level detector which causes a reduction in the rate of fluid flow through the valve as the liquid level in the container approaches the desired limit with the final filling of the container taking place at reduced rate.

Still another object of this invention is the provision of a dash-pot for a valve or nozzle to control the closing speed thereof in which the fluid in the dash-pot is under positive pressure thus preventing vaporizing of the fluid or entry of air into the valve or nozzle.

These and other objects and advantages will become more apparent upon reference to the drawings in which:

FIGURE 5 is a sectional view indicated by line 5—5 on FIGURE 2 showing the construction of the latch forming a part of the tripping mechanism;

FIGURE 6 is a fragmentary sectional view drawn at enlarged scale showing the seal between the valve and the tank inlet fitting;

FIGURE 7 is a sectional view indicated by line 7—7 on FIGURE 2 showing the arrangement of the operating lever;

FIGURE 8 is a fragmentary view drawn at enlarged scale showing the connection of the rod leading from the operating lever with the valve member of the valve; and FIGURE 9 is a sectional view showing the novel liquid level detector according to the present invention which is connected with the tripping mechanism of the valve.

Figure 1:
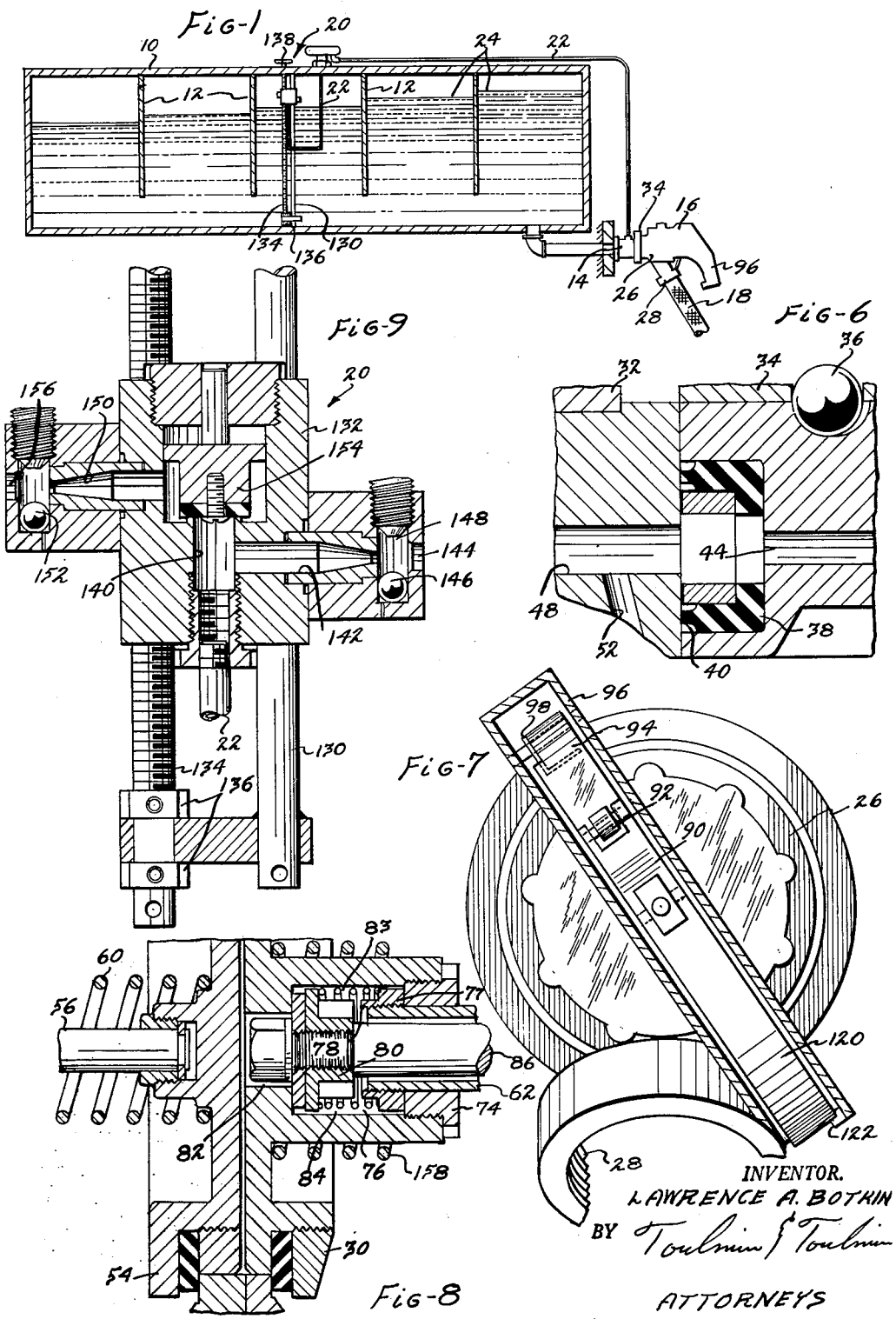
FIGURE 1 is a rather diagrammatic view showing a tank truck or the like being filled by means of a valve according to the present invention and with a liquid level detector according to the present invention in the tank and connected with the valve.

Referring to the drawings somewhat more in detail, in FIGURE 1 there is shown rather diagrammatically a tank 10 having partitions or baffles 12 therein extending downwardly from the top and which are provided for the purpose of preventing excessive movement of the liquid in the tank when it is being transported.

The tank is provided with an inlet fitting at 14 through which it is filled via valve 16 according to this inventon whch has a supply hose 18 leading thereto.

In about the middle of the tank there is a liquid level detector generally indicated at 20 which is connected by conduit 22 with the tripping mechanism of the valve so that when the liquid level in the tank rises to a predetermined level as detected by the detector the valve will trip closed.

A problem that arises in connection with tanks of this nature, particularly when they are filled rapidly is indicated by the varying liquid levels 24 in the several compartments formed by the baffles 12. It will be evident that the liquid levels in the various compartments vary when the tank is being filled at high speed and for this reason the detection of the level in the tank by the level detector is not reliable. For this reason, the present invention embodies a detector and valve combination in which a first level is detected at which time the valve trips partly closed and the final filling of the tank is accomplished at reduced rate thus giving the liquid levels in the several compartments ample time to equalize.

At a second and somewhat higher level, a second tripping of the valve takes place and at this time it closes off completely.

Referring now to FIGURES 2 through 8, the valve according to the present invention comprises a valve body 26 having a flow passage 28 therethrough that is controlled by valve member 30. The valve body is adapted for being attached to the inlet fitting 14 of the tank by an interrupted thread mechanism consisting of lug means 32 on inlet fitting 14 which cooperates with the manually rotatable ring 34 that is rotatably mounted on the valve body as by the balls 36.

The valve body 26 has an annular groove therein surrounding the port that is controlled by valve member 30 and located within the groove is a generally U-shaped rubber-like seal member 38, shown in enlarged scale in FIGURE 6, and which is characterized in having projections 40 of reduced width which engage the face of the tank inlet fitting 14 under pressure so as to provide a seal between the valve body and the tank inlet fitting.

One or more dowels 42 may be provided for accurately aligning the valve body with the inlet fitting. At one side of the valve body there is a passage 44 leading from diaphragm chamber 46 through the seal ring 38 and communicating with a passage 48 that is connected via check valve 50 with conduit 22 which, as previously mentioned leads to the liquid level detecting device.

This passage 48 also communicates via a metering passage 52 with the port in inlet fitting 14 through which fluid is supplied from the valve. This port is normally closed by valve member 54 mounted on a stem 56 slidable in a bushing 58 in the inlet fitting with there being a compression spring 60 normally biasing the valve member toward its closed position. When closed, valve member 54 substantially closes off the inner end of the passage 52.

Returning to the structure of the valve, valve member 30 is attached to the end of a tube 62 which extends backwardly from the valve member and passes sealingly through a closure wall 64 at one end of a dash pot cylinder 66. Inside the cylinder tube 62 is connected with a piston 68 having restricted port 70 extending therethrough. The closure wall 64 is provided with a check valve 72 which prevents fluid flow leftwardly through the closure wall but which yields to permit fluid to pass rightwardly therethrough.

The tube 62 extends through a nut 74 attached to a projection on the back of valve member 30 and on the tube that is located within the cavity 76 formed by the projection and the nut 74 there is a nut 77 that has a flange portion 78 extending beyond the end of tube 62.

Located within the cavity 76 is a pilot valve member 80 adapted for engaging the bottom of cavity 76 to close a port 82 therein that opens through the valve member. Spring 83 urges the pilot valve member toward position to close port 82.

Pilot valve member 80 is provided with axial ribs 84 on the back adapted for engaging flange 78. This arrangement provides for engagement of the pilot valve member with the said flange in such a manner that fluid flow can take place through tube 62 and about the pilot valve member 80 and into port 82.

The pilot valve member 80 is connected to the end of a rod 86 that extends through tube 62 with clearance and completely through dash pot chamber 66 and sealingly through the back wall 88 thereof. At its rear end outside the valve body rod 86 is pivotally connected with operating lever 90. This lever has a roller 92 at its upper end adapted for engaging an arm 94 pivoted in the frame part 96 that is fixedly attached to the valve body and with there being a torsion spring 98 urging arm 94 in a counterclockwise direction.

Arm 94 on the side opposite roller 92 engages the end of a plunger 100 spring urged rightwardly by a spring 102. This plunger is slidably mounted in the valve body and its end opposite its abutment with arm 94 is connected with a block 104 having a slot 106 extending in the direction of the axis of the plunger and which slot has an enlarged end portion 108.

The member or block 104 is also slotted longitudinally and between the legs thereof there is mounted a slide block or member 110 having rollers 112 that extend into slot 106 and the enlarged portion 108 thereof. Slide member 110 and block 104 are enclosed within a housing 114 and a spring 116 therein presses slide member 110 downwardly so that rollers 112 when positioned in the enlarged portion 108 of the slot will be moved downwardly toward the bottom thereof. At its lower end slide member 110 is attached to diaphragm 118 which closes the previously mentioned diaphragm chamber 46. At this point it will be evident that plunger 100 will be supported in its FIGURE 2 position by rollers 112 in the lower end of enlarged portion 108 of the slot in block 104 but that a supply of pressure to diaphragm chamber 46 will cause the diaphragm to flex upwardly and to move slide member 110 upwardly to dispose rollers 112 in alignment with the elongated portion of slot 106 and with the rollers so disposed the plunger 100 can then be moved leftwardly.

Returning now to lever 90, this lever also comprises a finger portion 120 which can be availed of for moving the lever rightwardly to open the valve. When the valve is wide open the lower end of portion 120 of the lever can be shifted laterally and disposed behind the ledge or abutment 122 formed on frame 96 to hold the valve open.

Another element which serves to control the lever 90 is a recycling latch pawl 124 pivoted to back wall 88 of the dash pot cylinder and biased by a spring 126 toward position to engage portion 128 of lever 90 and when the latch pawl is so engaged with the lever the valve will be cracked open for reduced flow therethrough.

Figure 2:
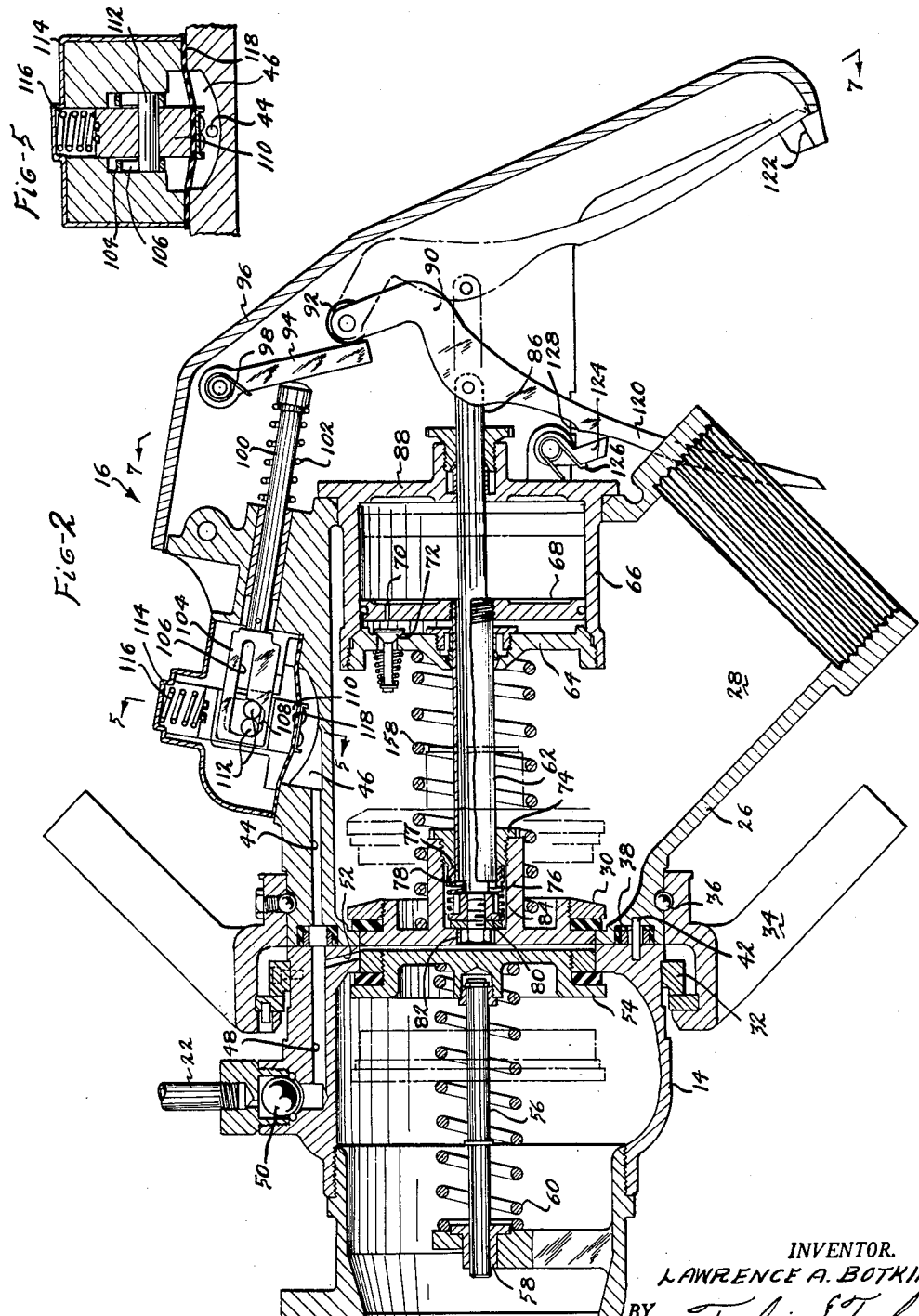
FIGURE 2 is a longitudinal sectional view through the valve as it appears when attached to the inlet fitting for the tank and with the valve closed and with the valve member and the operating lever dot-dashed in the open position of the valve.

As mentioned previously the valve is shown completely closed in its full line position in FIGURE 2 and completely open in its dot-dash position.

Figure 3:
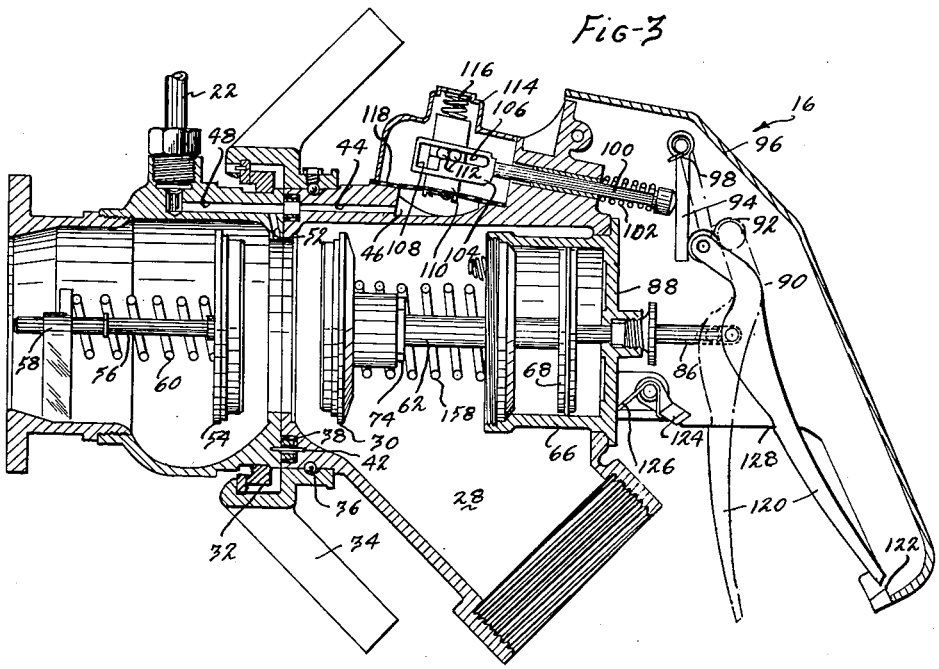
FIGURE 3 is a sectional view similar to FIGURE 2 but showing the valve at about the instant it trips off from its fully open position.

In FIGURE 3 the valve is illustrated as being tripped off from its wide open position and with the valve member moving toward closed position.

Figure 4:
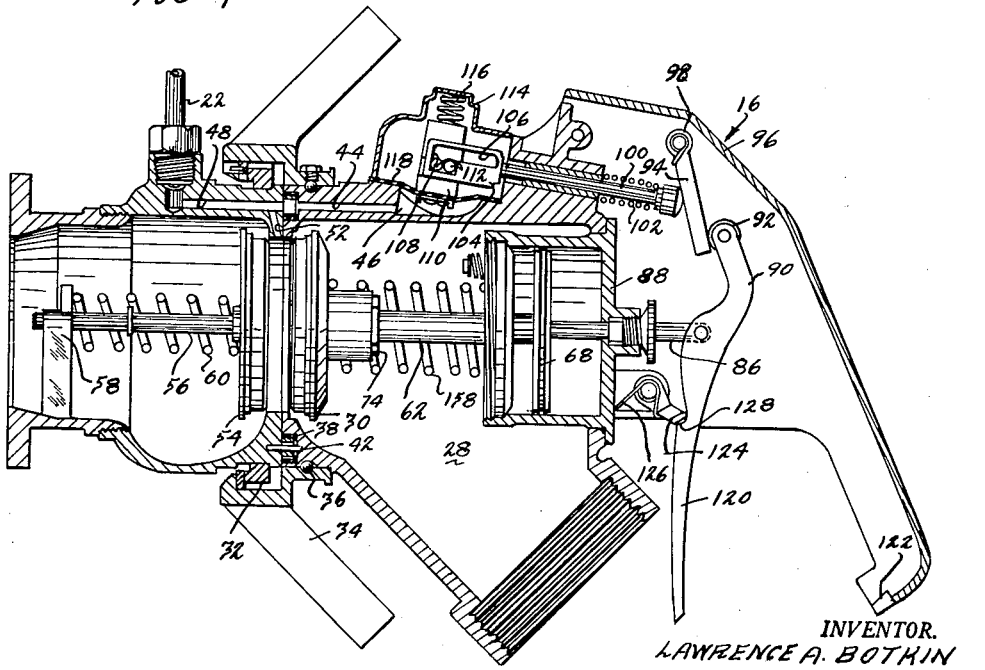
FIGURE 4 is a sectional view similar to FIGURE 3 but shows the valve member positioned in its reduced flow position and prior to the final tripping off thereof which will cause the valve to close completely.

In FIGURE 4 the valve is shown with lever 90 stopped by latch pawl 124 so that the valve member of the valve is cracked open for a reduced rate of flow therethrough.

Turning now to the structure of the liquid level detector, this is illustrated in FIGURE 9 wherein it will be seen that the detector comprises support rod 130 on which is slidable an orifice block 132. This block is threaded to a second rod 134 which is held against axial movement relative to rod 130 as by collars 136. Hand wheel 138 (see FIGURE 1) is attached to the upper end of threaded rod 134 so that by availing of hand wheel rod 134 can be rotated thus to adjust the vertical position of orifice block 132. The orifice block has a cavity 140 therein to which is connected the previously mentioned conduit 22 that leads to the valve tripping mechanism. Communicating with chamber 140 at a lower level is a nozzle 142 which normally discharges through a port 144. A ball 146 of a size to close off port 144 is mounted in cavity 148 so that when the liquid level rises and lifts the ball, which is selected so as to be buoyant in the liquid being dispensed, the port will be closed off by the ball thus impeding the discharge from nozzle 142 and cause a build up of pressure which will be reflected backwardly through conduit 22 to the tripping mechanism of the valve.

A second nozzle 150 is positioned at an upper level in orifice block 132 and has a similar control float ball 152. The nozzles are separated by the time delay valve member 154 which is so selected as to weight that closing of port 144 will cause the dispensing valve 16 to trip and to commence to move toward its closed position. Thereafter, valve 154 will lift and communicate cavity 140 with nozzle 150 thus causing a pressure drop in conduit 22 which, as will be seen hereinafter, causes valve 16 to halt in its cracked position with the supply of fluid to conduit 22 discharging from nozzle 150 through port 156 until the said port is closed by the second float ball 152 and at which time valve 16 will again trip and this time to its closed position.

When valve 154 lifts, the area thereof exposed to liquid from conduit 22 is greatly increased so that the valve will remain lifted under less than latch tripping pressure although it is necessary to develop latch tripping pressure to lift the valve off its seat.

*Operation*

In operation, the valve is connected with the inlet fitting by availing of the mechanism provided for this purpose. The conduit 22 is also connected with the valve and liquid can now be dispensed through the valve into the tank. This is accomplished by drawing lever 90 backwardly to its dot-dash position in FIGURE 2. The opening of the valve is preceded by the opening of port 82 by the pilot valve member because the rod first moves the pilot valve member opening the said port until the pilot valve member abuts flange 78 on nut 77. The opening of pilot valve member exhausts fluid from the right side of piston 68 so that this side of the piston is now under low pressure. The left side of the piston however is subjected to the pressure within the flow passage within the valve. The pressures on the opposite sides of piston 68 cannot equalize because the restricted passage 70 in the piston cannot supply fluid as rapidly as the fluid will pass through tube 62 and out past the pilot valve.

Accordingly, the movement of the valve member 30 toward its open position can be accomplished relatively easily even against the bias of the relatively strong closing spring 158. As the valve member opens and permits pressure fluid to act against the face of valve member 54, this valve member will yield and fluid will commence to flow through the inlet fitting to the tank. When lever 90 is drawn completely backwardly it can be latched on the fixed abutment 122, as described, and the valve will be retained in its fully open position.

Should it occur, through faulty mounting of the valve body on the inlet fitting, or through the failure of the valve body and the inlet fitting to seat together properly on account of foreign matter therebetween, that the valve and inlet fitting do not seal together, opening of valve member 30 will cause such a rapid supply of fluid into the space between the valve body and inlet fitting that the pressure cannot bleed off via passage 48 and pressure fluid will enter passage 44 even before valve member 54 opens and the dispensing valve will be tripped closed. This provides an important safety feature, particularly in connection with inflammable, explosive, or corrosive fluids.

With the lever 90 latched in its wide open position, fluid will be supplied rapidly to tank 10 until the liquid level therein rises to the point that ball 146 will close port 144.

With fluid flowing through the inlet fitting the valve member 54 thereof is disposed in its FIGURE 2 dot-dash position and this permits fluid to pass through passage 52 to passages 44 and 48 and from the latter past check valve 50 to conduit 22 whence the fluid flows to chamber 140 in orifice block 132 and thence outwardly through nozzle 142 and port 144 into the tank until the rising liquid level in the tank lifts ball 146 high enough to bring about closing of port 144 thereby.

The closing of port 144 by ball 146 as described above occurs very suddenly when the ball is lifted to the point where it comes under the influence of the jet of fluid from nozzle 142. At the instant that the ball closes against port 144, there will be a sudden pressure rise in conduit 22 which is reflected back through passages 48 and 44 to diaphragm chamber 46 and this will cause the diaphragm to flex upwardly thus moving slide block 110 upwardly and carrying rollers 112 upwardly so that they align with slot 106. At this time the spring 158 will cause lever 90 to rock counterclockwise about its lower end which is retained by latch member 122. This occurs because arm 94 and plunger 100 yield under the bias of spring 158.

Valve member 30 is now moving toward its closed position but its movement is checked by dash pot piston 68 which can only move at the rate that fluid will flow from the left hand side thereof through restricted metering port 70. Due to the relatively slow movement of the valve member, immediately after the valve tripping mechanism operates, the time delay valve member 154 will lift and conduit 22 will commence to discharge through nozzle 150. This brings about a reduction in the pressure in conduit 22 and passages 48 and 44 and in the diaphragm chamber so that spring 116 again has the superior effect on the slide block 110 and diaphragm 118.

After a relatively small amount of movement of valve member 30, lever 90 is dragged to the point that its lower end will slip off abutment member 122. The lever 90 is now free to pivot about the end of rod 86 and does so, so that spring 102 is again effective for resetting the latch mechanism by moving plunger 100 rightwardly and at which time, due to the reduced pressure under diaphragm 118, the latch mechanism is reset to its FIGURE 2 position. The conditions that obtain at the time the valve is tripped off as described above and lever 90 drags off the latch member 122 are depicted in FIGURE 3.

With the tripping mechanism reset, the valve member 30 continues on toward its closed position until lever 90 is pulled into engagement with the recycling latch pawl 124. This stops the lever 90 and the valve member so that the valve is cracked open as depicted in FIGURE 4. This permits a reduced rate of fluid flow through the valve and the liquid in the tank now rises at a slower rate while turbulence in the tank will subside and any liquid levels therein that differ from one another will have an opportunity to equalize.

The liquid level in the tank now rises until ball 152 is lifted as previously described in connection with ball 146 to cause closing of port 156 and at which time the valve tripping mechanism will again operate in the same manner as previously described except that the second tripping off of the valve will permit the valve member to go completely closed and the tripping mechanism will not reset.

The valve member 54 of the inlet fitting will also close so that the valve can now be uncoupled from the inlet fitting. Substantially no liquid will be lost at this time because the valve members are almost in face to face engagement.

The valve can be reopened whenever desired by manually moving latch pawl 124 out of engagement with lever 90 whereupon springs 102 and 116 will reset the tripping mechanism.

The valve of the present invention is relatively compact due to the arrangement of the dash pot chamber as illustrated and is characterized in being easy to open while being prevented from slamming closed when it is tripped off.

The valve structure cooperates with the double liquid level detector to insure accurate filling of a tank without waste of time.

A feature of the present invention is to be found in the design of the closing mechanism of the valve. In connection with most valves or nozzles of the nature illustrated in this application, the dash pot is at least equal to the size of the valve disc and is generally somewhat larger. This comes about because conventional dash pots operate on suction to delay movement of the valve member or valve disc and thus must be a substantial size in order to develop the force needed to prevent the valve member or valve disc from slamming closed. In the present invention however, the fluid which is effective for causing the dash pot to prevent the valve member or disc from slamming closed is entrapped and is under positive pressure. This permits the use of a considerably smaller dash pot piston and also prevents vaporizing of the dash pot fluid which might occur if volatile liquids were being handled by the valve or nozzle structure.

Further, the positive pressure dash pot arrangement prevents air from being sucked into the valve or nozzle. The dash pot according to the present invention is thus more compact than dash pots according to the prior art of the suction type and the difficulties in connection with vaporizing of the dash pot fluid and leaking of air into the valve or nozzle are eliminated.

It has been mentioned that the valve or nozzle of the present invention is of the easy opening type, and this comes about because there is a pressure on the dash pot piston which is opposed to the pressure standing on the back of the main valve member or valve disc. This balancing of thrusts on the movable valve member structure makes it easy for the valve member or valve disc to be moved to its open position. However, should, for any reason, the pilot valve fail to close, the possibility exists that with such an arrangement, if the dash pot piston were larger than the valve member or valve disc, the leaking pilot valve would permit pressure to develop on the one side of the dash pot piston and thus pull the main valve member or valve disc at least partially open leading to what could be an extremely dangerous leakage of fluid from the main valve.

By making the dash pot member so that it operates under positive pressure according to this invention, the dash pot piston is made smaller than the main valve member or valve disc so that even if the pilot valve fails to close, the main valve member or valve disc will always seat properly within the valve.

It will be understood that this invention is susceptible to modification in order to adapt it to different usages and conditions; and, accordingly, it is desired to comprehend such modifications within this invention as may fall within the scope of the appended claims.

I claim:

1. In an easy opening-soft closing valve structure; a valve body having a flow passage with a seat, a main valve member in the valve body for engaging the upstream side of the seat so the pressure in the passage acts to hold the valve member against the seat, a cylinder spaced from said main valve member on the upstream side of the main valve member, a piston reciprocable in the cylinder and connected with the main valve member, a check valve in the cylinder opening from the said passage to the side of the piston toward the main valve member so the piston is thrust in a direction opposite to the valve member, a restricted orifice extending through the piston so the piston is balanced when the main valve member is closed and is stationary, and a pilot valve connected between the downstream side of the main valve member and the side of the piston opposite the valve member operable when opened to release fluid from the piston more rapidly than fluid will pass through said orifice, said piston being at least slightly smaller in diameter than said main valve member whereby even in the event of failure of the pilot valve to close completely the said main valve member will be thrust toward its seat by pressure in the flow passage controlled by the valve member.

2. In an easy opening-soft closing valve structure or nozzle; a body having a flow passage pass therethrough with a seat, a main valve member in the body for engaging the upstream side of the seat whereby pressure in the passage acts on the valve member to hold it against said seat, a cylinder in the body spaced from said main valve member on the up stream side of the main valve member, a piston reciprocable in the cylinder and connected with the main valve member, a check valve in the cylinder operable for passing fluid from said flow passage into the cylinder on the side of the piston that is toward the valve member while preventing fluid flow in the opposite direction from said cylinder, said piston being at least slightly smaller in effective area than said main valve member whereby the thrust on said piston from fluid supplied to said cylinder from said flow passage is less than thrust on said main valve member from the fluid in said passage so that the valve member will normally remain closed, a restricted orifice extending through the piston, and a pilot valve connected between the down stream side of the main valve member and the side of the piston opposite the valve member operable when opened to release fluid from the piston more rapidly than fluid will pass through said orifice.

3. In an automatic valve structure; a valve body having a flow passage therethrough with a seat, a main valve member in said body spring urged toward said seat to close said passage, a rod connected with said valve member and leading therefrom in a direction away from said seat, a lever pivoted between its ends to the end of the rod, a fulcrum element movably carried by the valve body operable in effective position to engage one end of the lever, a latch normally holding the said element in effective position, means to trip the latch to release the element from effective position, spring means to reset the latch, dash pot means connected with the main valve member to retard its closing movement, and means operable releasably to engage the lever before the main valve member is completely closed, said dash pot means comprising a piston spaced from and connected to said valve member and smaller in diameter than said main valve member, a cylinder spaced from the main valve member in which the piston is reciprocably mounted, means for supplying fluid from said flow passage to the cylinder on the side of said piston toward the main valve member whereby the dash pot operates under positive pressure, and means for releasing the fluid so supplied to said cylinder therefrom to the downstream side of said main valve member at a controlled rate thereby effecting positive control of the closing rate of said main valve member.

References Cited in the file of this patent
UNITED STATES PATENTS

| | | |
|---|---|---|
| 1,124,225 | Hobson | Jan. 5, 1915 |
| 2,673,707 | McRae | Mar. 30, 1954 |
| 2,681,073 | Fraser | June 15, 1954 |
| 2,692,113 | Larkin | Oct. 19, 1954 |
| 2,816,567 | Rittenhouse | Dec. 17, 1957 |
| 2,840,122 | Klikunas et al. | June 24, 1958 |
| 2,948,307 | Rittenhouse et al. | Aug. 9, 1960 |